United States Patent [19]

Stowasser et al.

[11] 3,771,718

[45] Nov. 13, 1973

[54] WATER COOLING METHOD AND APPARATUS

[75] Inventors: William F. Stowasser; Keith A. Miller, both of Allentown, Pa.

[73] Assignee: Air Products and Chemicals, Inc., Allentown, Pa.

[22] Filed: Mar. 16, 1972

[21] Appl. No.: 235,173

Related U.S. Application Data

[62] Division of Ser. No. 49,859, June 25, 1970, Pat. No. 3,672,182.

[52] U.S. Cl. ............................................. 239/133
[51] Int. Cl. ............................................. B05b 1/24
[58] Field of Search ................ 239/133, 135; 62/52

[56] References Cited
UNITED STATES PATENTS
3,255,967   6/1966   Kenney .......................... 239/133
2,647,017   7/1953   Coulliette ...................... 239/133 X
2,914,221   11/1959  Rosenthal ...................... 239/133 X
3,393,676   7/1968   Kummer et al. ................. 239/133 X

*Primary Examiner*—Lloyd L. King
*Attorney*—James J. Shanley et al.

[57] ABSTRACT

Water is cooled by the direct injection thereinto of liquid nitrogen. Preferably, heat is applied in the vicinity of the injection zone and preferably the injection of the liquid nitrogen is intermittent with inert gas being injected when liquid nitrogen is not injected. The application of the heat and the injection of the gas eliminates the tendency of the injector to be plugged by ice formation.

6 Claims, 7 Drawing Figures

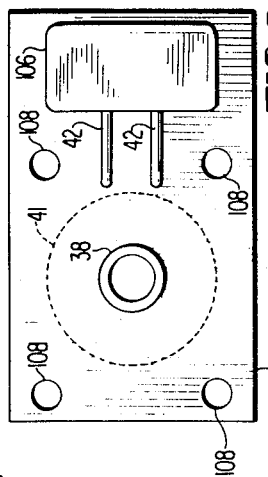
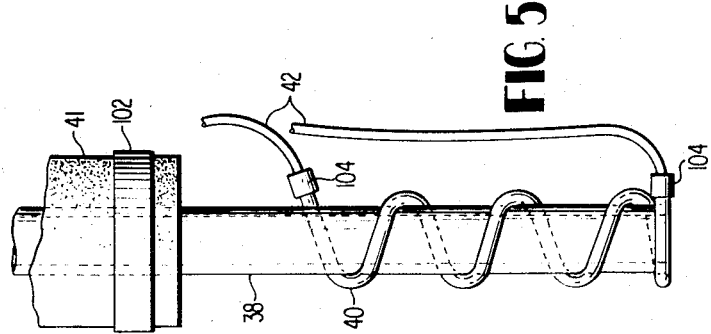
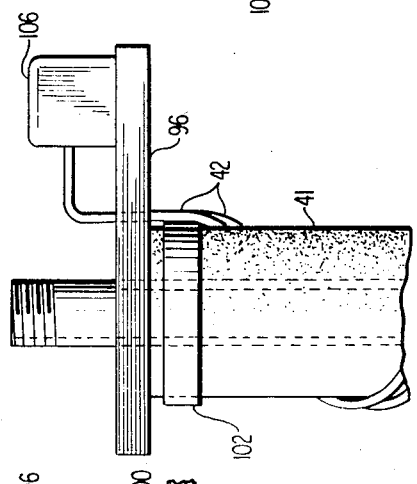
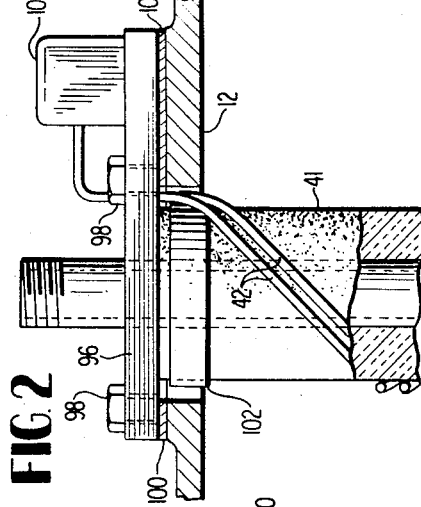
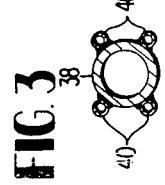
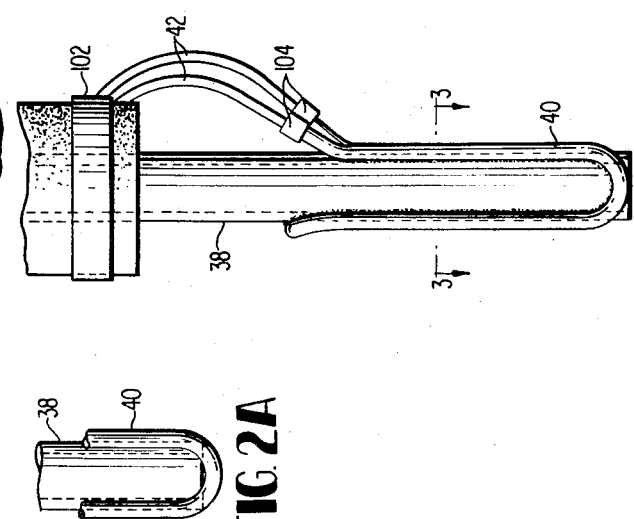

WATER COOLING METHOD AND APPARATUS

This is a division, of application Ser. No. 49,859, filed June 25, 1970 now U.S. Pat. No. 3,672,182.

BACKGROUND OF THE INVENTION

This invention is directed to a method and apparatus for cooling a liquid by injecting thereinto a liquefied gas. This method and apparatus are especially useful for providing cooled water which can be utilized for example in the batch mixing of concrete.

In concrete preparation cooled water is ordinarily mixed with warm cement, crushed stone and sand in a conventional mixer. If the temperature of the concrete mix exceeds 80°–85° F. prior to pouring the strength of the poured set concrete can be reduced below acceptable levels. Especially during the warm summer months the crushed stone and sand ingredients can be at a temperature such that the temperature of the mix will exceed the aforedescribed upper limit if the water ingredient is not cooled.

One method of controlling the temperature of the mix discharged from the concrete mixer to within acceptable limits has been to add at least a portion of the water to the mixer in the form of crushed ice; because of ice processing and handling problems this is not an especially good solution.

The present invention is directed to a method for overcoming such handling problems by providing cold water as an ingredient by the injection of liquefied gas into the water supply whereby it is cooled to a predetermined temperature or to a temperature within predetermined limits, said temperature being above the freezing point of the water.

One problem involved with this type of cooling method is the control of the cooling in local areas. In particular, the water in the vicinity of the liquefied gas injector tends to freeze at the discharge point plugging the injector so that further liquefied gas cannot emit from it.

Another problem involved with this type of cooling method is maintaining the injector tube clear and unclogged during those periods when liquefied gas is not being injected, that is, during those periods when the water supply into which the liquefied gas is being injected has reached its prescribed temperature. In other words, when liquefied gas is not being injected into the water, the water in the supply being cooled can back up into the injector, freezing therein and plugging the same.

Cooling methods are known in the prior art wherein liquefied gas has been ejected into a reservoir of liquid for cooling purposes. For example, Dodkin U.S. Pat. No. 2,428,412 discloses the injection of liquid carbon dioxide, liquid ethane, liquid propylene, or liquid propane into methyl alcohol, ethylene glycol, kerosene or acetone to cool the latter liquid for use for unblocking lenses. Seefeldt U.S. Pat. No. 2,759,336, Hessen et al. U.S. Pat. No. 2,988,898 and Williamson U.S. Pat. No. 2,966,039 each discloses the injection of liquefied carbon dioxide into an organic liquid to cool the organic liquid. Each of these references discloses that the carbon dioxide tends to solidify in the injection device thereby blocking further injection. Each of these references offers a solution to this problem. In Seefeldt blocking is eliminated by the use of a nozzle including rotating vanes which extend longitudinally through the nozzle. In Hessen et al blocking is eliminated by including within the nozzle a restricted opening whereby solidified carbon dioxide is suspended in a vapor stream during the course of injection. The Williamson patent is addressed particularly to the problem of blockage by solidified carbon dioxide due to intermittent injection of the liquid carbon dioxide. The blockage is prohibited by expelling residual liquid carbon dioxide from the injector on shut down by releasing a charge of vaporized carbon dioxide which has been maintained under pressure into the injector. No reference has been found, however, which discloses the problem of blockage of the injector by the freezing of the liquid which is being cooled, which is the problem in the present case. Moreover, no reference has been found which discloses the use of local heating to solve blockage due to liquefied gas injection while said local heating is an important feature of one of the embodiments herein. Moreover, no reference has been found wherein vapor is continuously introduced through the injector during periods when the liquefied gas is not being injected while such continuous introduction is an important feature of the one of the embodiments herein.

The present invention is directed to the use of a particular liquefied gas for the purpose of cooling a liquid. This particular liquefied gas is liquid nitrogen. Only one reference is known wherein liquid nitrogen has been injected into another liquid to cool the latter. That reference is Morrison U.S. Pat. No. 2,909,433. In Morrison, liquid nitrogen is injected during ice cream preparation to expand and freeze the ingredients. Since freezing of the treated liquid is an object in Morrison, no steps are taken therein to negate freezing.

BRIEF DESCRIPTION OF THE DRAWINGS

In describing preferred embodiments of the invention reference is made hereinafter to the accompanying drawings in which:

FIG. 2 is an elevational view of a preferred injector nozzle assembly for use within the scope of the present invention. The injector nozzle assembly is shown bolted in place in a tank wall;

FIG. 2A is a fragmentary view in elevation showing a slight modification of the heating element of FIG. 2;

FIG. 3 is a cross-sectional view taken along lines 3—3 of FIG. 2;

FIGS. 4 and 5 are elevational views of other injector nozzle assemblies useful within the scope of the present invention;

FIG. 6 is a plan view of the assembly depicted in FIG. 4.

DETAILED DESCRIPTION OF PREFERRED EMBODIMENTS OF THE INVENTION

Figure 1:
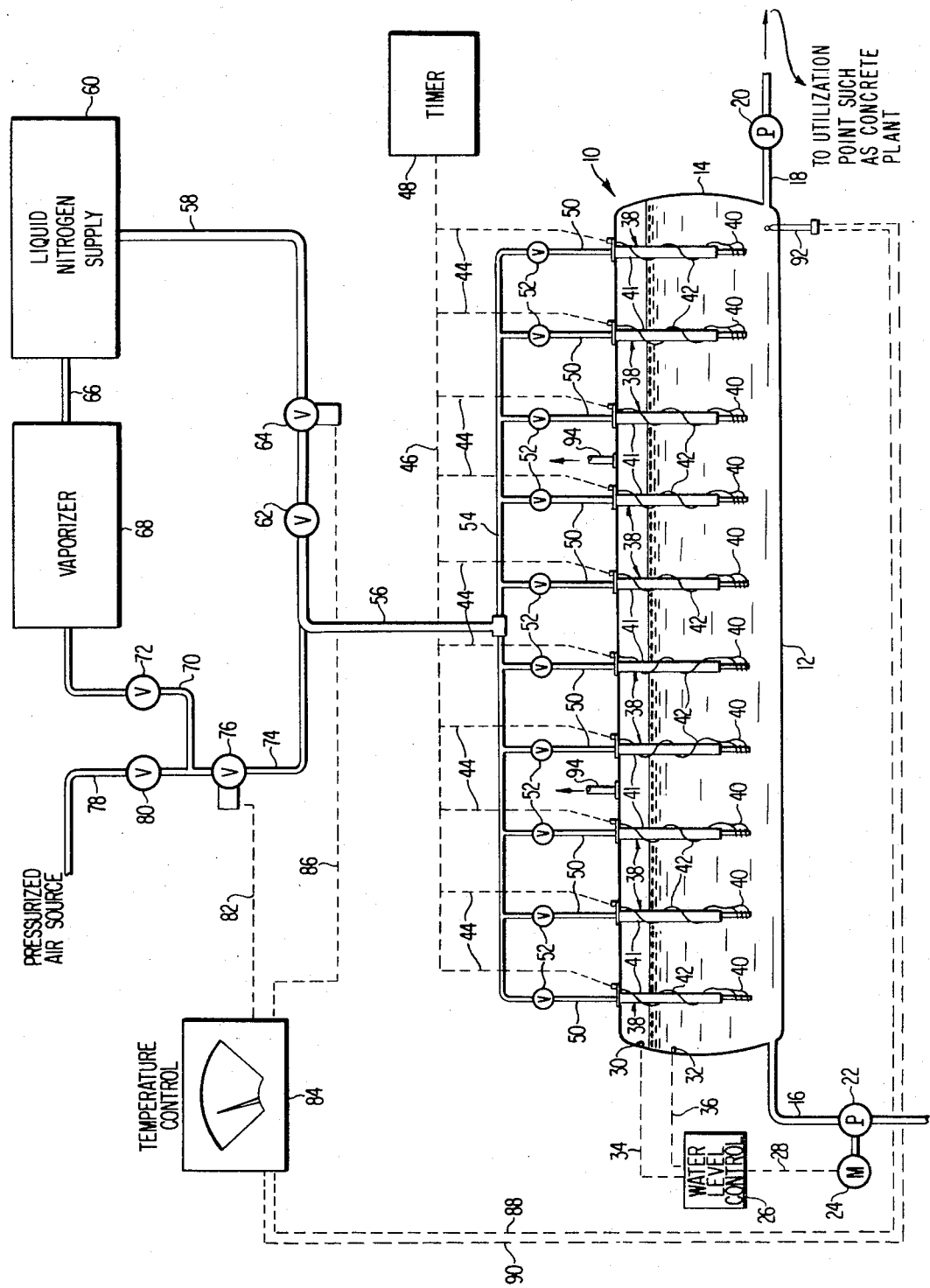
FIG. 1 is a schematic diagram in elevation of a preferred cooling method and apparatus within the scope of the present invention.

Referring to FIG. 1 there is shown a system and method for cooling water by liquid nitrogen injection into the water wherein heat is applied in the vicinity of the injection zone to maintain said zone free from ice blockage. The system comprises a cylindrical tank 10 having a side wall 12 and end walls 14. The end walls 14 have outer surfaces which are slightly convex. The longitudinal axis of cylindrical tank 10 is horizontally oriented.

Communicating with cylindrical tank 10 is a water inlet line 16. The upstream end of line 16 leads from a source of water, for example, a well. Line 16 communicates with tank 10 in the lower portion of one of its end walls 14. Also communicating with tank 10 is water outlet line 18. The downstream end of line 18 is at the location where the cold water product is to be utilized. The line 18 communicates with tank 10 at the lower portion of the wall 14 opposite to that end wall 14 with which line 16 communicates. Line 18 is equipped with a pump 20 which is operated to withdraw cooled water from tank 10 and pump it to the location where it is to be utilized. Line 16 is equipped with a pump 22 which is driven by a motor 24 which operates in response to a signal generated by water level control 26 and received by motor 24 via electricity conductor 28. Control 26 operates in response to signals from indicating points 30 and 32, respectively, via conductors 34 and 36. Point 32 is the lower indicating point and point 30 is the upper indicating point. If as a result of water withdrawal via line 18 the level in tank 10 falls below point 32, water level control 26 activates motor 24 via conductor 28 to operate pump 22 so that water is fed into tank 10 via line 16. When the water level reaches point 30, water level control 26 deactivates motor 24 via conductor 28 to shut off pump 22 whereby the water flow through line 16 into tank 10 is discontinued.

Tank 10 is equipped with a plurality of injector nozzles or lances 38 for the injection of liquid nitrogen into cylindrical tank 10. Each of the nozzles is vertically oriented. Each of the nozzles is mounted in side wall 12 along a line defined by the intersection of side wall 12 with a vertically oriented plane which passes through the longitudinal axis of tank 10. The nozzles 38 are more or less uniformly spaced along said line to provide distribution of liquid nitrogen injection throughout the water. Each of the nozzles has a single outlet which is in its downstream end. Each of the nozzles is equipped with a heating element 40 in its lower portion. The heating elements 40 are connected via leads 42 and conductors 44 and main conductor line 46 to timer 48 which functions to activate heating elements 40 in accordance with a preset time schedule. The upper portion of nozzles 38 is covered by insulation denoted 41. The particular design of the heating elements and the description of the function of the elements and of the nozzles will be described in more detail hereinafter.

Communicating with the upstream ends of each of the nozzles 38 are branch liquid nitrogen supply lines 50, each of which is equipped with a valve 52. The upstream end of each of these branch lines 50 communicates with a main nitrogen supply line 54 which in turn communicates via lines 56 and 58 to reservoir 60 for the storage of liquid nitrogen which can simply be a tank under pressure. Liquid nitrogen can be supplied to reservoir 60, for example, by tank trucks. Line 58 is equipped with valves 62 and 64.

Also communicating with liquid nitrogen reservoir 60 is a line 66 which leads into a vaporizer 68 which can simply be an expansion chamber or heat exchanger. Vaporizer 68 has an outlet line 70 which contains a valve 72 and communicates at its downstream end with a line 74 which in turn communicates with line 56. Line 74 is provided with a valve 76. Also communicating with the upstream end of line 74 is a line 78 which contains a valve 80. Line 78 communicates at its upstream end with a source of pressurized air.

Valve 76 is connected via a conductor 82 to a temperature control 84. Valve 64 is connected via a conductor 86 to temperature control 84. Temperature control 84 also communicates via conductors 88 and 90 to a temperature sensing probe 92. Temperature sensing probe 92 can be, for example, a thermocouple and is preferably located close to the water exit end of tank 10.

Tank 10 is provided with nitrogen gas vent lines 94 which communicate with its side wall at the top of the tank.

The water in tank 10 is cooled to a predetermined temperature level for example, 33 to 40° F. by the injection into tank 10 below the water level of liquid nitrogen via nozzles 38.

The nitrogen injection is controlled by temperature control 84 which is activated by signals generated by temperature sensing probe 92. When the temperature of the water in tank 10 as sensed by probe 92 is above the predetermined temperature desired, a signal is sent via conductors 88 and 90 to temperature control 84 which operates via connection 86 to open valve 84. During operation valves 62 and 52 are maintained in open position. As a result of the opening of valve 64, the liquid nitrogen under pressure in reservoir 60 flows via lines 58, 56, 54 and 50 into and through nozzles 38 and into the water in tank 10 to cool said water. When the temperature of the water in tank 10 reaches the predetermined desired level as sensed at the temperature sensing point of probe 92 a signal is sent via conductors 88 and 90 to temperature control 84 which operates to close valve 64.

During operation valve 72 is ordinarily maintained open and valve 80 is ordinarily maintained closed. Liquid nitrogen from reservoir 60 which has been introduced via line 66 into vaporizer 68 is vaporized therein to provide dry nitrogen gas.

Temperature control 84 operates to open valve 76 at the same time when it operates to close valve 64. As a result of the opening of valve 76 the nitrogen gas from vaporizer 68 flows via lines 70, 74, 56, 54 and 50 into and through nozzles 38 and emits from the downstream openings in nozzles 38 below the water level in tank 10. as a result of nitrogen gas being fed through nozzles 38 during those periods when liquid nitrogen is not fed through those nozzles, the water in tank 10 is not allowed to back up into nozzles 38 whereby freezing of the water in nozzles 38 and plugging of the same is prevented.

At any time when the temperature level as sensed by temperature sensing element 92 exceeds the desired level a signal from probe 92 activates temperature control 84 to close valve 76 and open valve 64 whereby liquid nitrogen is again fed into the water in tank 10 and nitrogen gas feed is discontinued.

Pressurized air is maintained available so as to be used in place of vaporized nitrogen in case the nitrogen supply is low or the nitrogen vaporizer is not working properly. In other words, the pressurized air is a back up for the vaporized nitrogen. In the event that vaporized nitrogen is not utilized, valve 72 is maintained closed and valve 80 is maintained open whereby pressurized air is fed through nozzles 38 during those periods when liquid nitrogen is not supplied through nozzles 38. Preferably the pressurized air is dry.

Cooling of the water is achieved as a result of the liquid nitrogen fed into tank 10 vaporizing in the water in tank 10 abstracting from the water an amount of heat substantially equal to the heat of vaporization of the liquid nitrogen plus the sensible heat required to raise the temperature of the resulting nitrogen vapor to the temperature of the water. The gaseous nitrogen resulting from the vaporization of liquid nitrogen which has been fed into the tank and also the nitrogen vapor or pressurized air which has been fed through nozzles 38 during those periods when liquid nitrogen is not fed into the tank 10, are vented from tank 10 via lines 94. The gas vented via lines 94 is at approximately the temperature of the water in tank 10 and is saturated with water.

During the operation of the aforedescribed system the water level is maintained within prescribed limits as aforedescribed.

During the operation of the aforedescribed system heating element 40 is utilized in accordance with a preset time schedule as previously described to supply heat in the vicinity of the injector outlet to prevent ice formation at the end of the injector and to prevent ice from bridging from the side wall of the injector pipe around the end of the injector. Thus, heating element 40 supplies heat both at the end of its nozzle and along the side wall of the nozzle near the end of the nozzle. As previously mentioned the heat is supplied in accordance with a preset time schedule. In other words, the heating elements 40 are operated in response to a signal from timer 48 so that heat is supplied at regularly scheduled intermittent periods. For example, timer 48 activates switches whereby electrical current is supplied to heating elements 40, for example, during a 30 second period out of each minute. When this period is at an end, timer 48 activates said switches to close whereby electric current is no longer supplied to heating elements 40. The electric current passes via lead wires described in more detail hereinafter into heating elements 40 and produces heat as a result of passing through the resistance offered by elements 40.

Turning now to FIGS. 2 and 3, there is depicted a preferred injector nozzle and heating element combination. With continuing reference to FIGS. 2 and 3 the nozzle 38 is shown mounted in the side wall 12 of a cylindrical tank 10. Nozzle 38 is mounted in side wall 12 by the use of mounting plate 96 which is welded or otherwise suitably connected to nozzle 38. Mounting plate 96 is bolted to side wall 12 by bolts 98. A watertight connection is made between side wall 12 and plate 96 by the use of gasketing material 100. The nozzle 38 has at its upper end insulating material 41. Water is prevented from passing between insulating material and nozzle 38 and freezing on nozzle 38 by radiator hose clamps 102 around and near both ends of insulating material 41. The nozzle 38 has adjacent its downstream portion a heating element 40 which is described in detail hereinafter. Heating element 40 is connected at transition joints 104 to leads 42 which are spiralled around insulation 41 and eventually pass through plate 96 in watertight fashion to a source of electricity 106. The leads 42 are spiralled around the outside of insulation 41 so that the leads can yield as the nozzle expands or contracts due to the temperature of the material passing through it. If this expansion room is not provided by the spiralling of the leads, for example, if the leads are directly run along insulation 41 parallel to the longitudinal axis of nozzle 38, said leads can crack or break due to said expansion and contraction.

The heating element depicted in FIGS. 2 and 3 is a preferred heating element for use within the scope of the present invention. The heating element 40 is essentially a conductor having a resistance such that when current is passed through it, heat is provided. It is essentially a conducting wire with each of its ends being connected to one of the transition joints 104. In its path between the transition joints heating element 40 first proceeds in essentially U-shaped configuration with each of the vertical sides of the U being positioned parallel to the longitudinal axis of nozzles 38 and adjacent the outer surface of nozzle 38. The edge of the side wall of nozzle 38 which defines the outer boundary of the end of nozzle 38 and the lowermost point at the bottom of the U are in the same horizontal plane. The vertical portion of the U farthest from transition joint 104 extends approximately from the end of the nozzle to a point approximately opposite the transistion joints 104. Starting at this point the heating element 40 is positioned in a direction transverse to the longitudinal axis of nozzle 38 but is still maintained adjacent nozzle 38 whereupon it doubles back still positioned adjacent nozzle 38 but this time in a direction parallel to the longitudinal axis of nozzle 38 until once more it reaches the downstream end of nozzle 38 thus forming a second U-shaped configuration, this one having its base approximately opposite the transition joints 104. The heating element then proceeds transversely adjacent the edge of the side wall at the downstream end of the nozzle 38 whereupon it doubles back still adjacent nozzle 38 but in a direction parallel to the longitudinal axis of nozzle 38 whereupon it joins a transition joint 104. This doubling back provides a third U-shaped configuration as part of the path of the heating element. The transverse dimension of each of the U-shapes is approximately equal in length to and opposite an inner radius of nozzle 38. Just previous to joining transition joints 104 the heating element turns outwardly from the outer surface of nozzle 38 so that transition joints 104 are not adjacent nozzle 38. Thus the heating element 40 depicted in FIGS. 2 and 3 follows the path consisting essentially of three U-shaped configurations in sequence with the first and third U-shaped configurations being essentially parallel and the second U-shaped configuration being formed by the joining of the inner vertical legs of each of said first and third configuration each of said vertical legs extending in a direction parallel to the longitudinal axis of the nozzle, with the lower end of the base of each of the first and third U-shaped configurations being essentially in a plane parallel to the end of the nozzle, the path being adjacent the outer surface of the nozzle, except just previous to where the path ends at transition joints 104 at which point the path at each end turns slightly outwardly from said nozzle. A heating element of this configuration and positioning is suitable to prevent ice formation at the end of nozzle 38 and to prevent ice from forming along the side surfaces of nozzle 38 which might bridge from said side surface around the end of nozzle 38.

A suitable variation of the heating element depicted in FIG. 2 is shown in FIG. 2A. In FIG. 2A the U-shaped portions of the heating element adjacent the end of nozzle 38 have the upper surface of their bases substantially lying in a plane containing the end of nozzle 38 as distinguished from FIG. 2 wherein the lower surface of said U-shaped portions substantially lies in said plane.

Nozzles having other suitable heating elements are depicted in FIGS. 4 and 5.

In FIG. 4 there is shown a nozzle 38 mounted in a mounting plate 96, the nozzle having surrounding its upstream portion insulation 41 with a watertight seal being provided between nozzle 38 and insulation 41 by radiator hose clamps 102. Leads 42 spiral around insulation 41 and pass through mounting plate 96 to source of electricity 106. The leads 42 are connected to heating element 40 via transition joints 104. In the embodiment of FIG. 4 the heating element 40 spirals around nozzle 38 until it reaches a point adjacent the end of nozzle 38 whereupon it doubles back spiralling around nozzle 38 so that the doubled back spiral portion is essentially parallel to the first described spiral portion. A plan view of FIG. 4 is shown in FIG. 6. In FIG. 6 the mounting plate 96 is shown containing four openings 108 through which bolts can be passed to fasten the plate to a water supply tank wall.

In FIG. 5 there is depicted a nozzle 38 with insulation 41 held in place by radiator clamps 102 having a heating element 40 which is connected at transition joints 104 to leads 42. The heating element proceeds in a path adjacent the outer surface of the lower portion of the outer surface of nozzle 38 in spiral fashion around said outer surface of nozzle 38 with one of the transition joints 104 being adjacent the downstream end of nozzle 38.

It is emphasized that the vertical positioning of the nozzles with respect to the water supply tank 10 is an important aspect of one of the embodiments of the present invention. If the nozzles are positioned horizontally instead of vertically the turbulence caused by the emanating liquid nitrogen can cause said water supply reservoir to be unstable.

The following example further illustrates a preferred water cooling method and apparatus within the scope of the present invention.

EXAMPLE

The system and method depicted in FIG. 1 is utilized in this example. The heating element on each nozzle has a configuration as depicted in FIG. 2A.

With reference to FIG. 1, the tank 10 is 50 feet long and has a 10 foot diameter. It holds 20,000 gallons. Each of the nozzles extends radially into the tank a distance of 7 feet 3 inches. Ten nozzles are employed. Each of these nozzles is made of three-fourths inch nominal brass pipe. Each heating element is bonded to the outer surface of its nozzle with silver solder. Each heating element extends in a direction parallel to the longitudinal axis of its nozzle a distance of 8 inches. The leads to each heating element spiral around the insulation 41 three times. Vent lines 94 each have 18 inch inside diameters. The leads 42 are M-I cable.

Water enters the tank 10 at 65° F. The system and method of FIG. 1 is utilized to cool this water to 35° F. The cooled water is utilized to prepare concrete. The concrete is prepared in 9 cubic yard batches. Two hundred and sixty-five gallons of water are utilized to prepare a 9 cubic yard batch of concrete. 35° water is sufficient to cool the concrete mix to a temperature less than 80° F. even though the sand and stone ingredients of the concrete are at 92° F.

The system is operated continuously. For each 9 yard batch, 37.8 pounds of liquid nitrogen is injected through each of the 10 nozzles into the mass of water in tank 10. The heating elements are activated 50 percent of the time with heat being supplied during 30 continuous seconds of each minute and then no heat being supplied for 30 continuous seconds. Each heating element is on for one half of each hour and during that period consumes one kilowatt-hour of electric energy.

As a result of the heating element functioning the water is cooled to 35° F. by the liquid nitrogen injection without water freezing in or around any of the nozzles to plug said nozzles. As a result of the leads being spiralled around the insulation, said leads do not crack or break due to contraction or expansion of the nozzles during operation.

If 33° F. water is desired, and sufficient liquid nitrogen is added to achieve this temperature, 1.8 kilowatt-hours of electric energy should be consumed by the heating element of each nozzle during each one half hour period the heating element is on to keep the nozzle free from plugging.

More cooling can be provided by the utilization of the spent nitrogen emanating from vent lines 94 to cool the stone ingredient by introducing the spent nitrogen into the bin containing the stone ingredient and then exhausting the same.

The invention may be embodied in other specific forms without departing from the spirit or essential characteristics thereof. For example, the nozzles can be adjustable. In the production of concrete additional cooling may be supplied, for example, by adding some of the water as ice in the mixer or by spraying liquid nitrogen on the stone and/or sand ingredients or by collecting spent nitrogen which emanates from vent lines 94 and conducting this spent nitrogen to the stone ingredient to provide some cooling to said ingredient. Beside variations in the nozzle and variations in the method of providing cooling for concrete making, many other variations come within the spirit and scope of the invention. For example, the heating element can be of other specific configurations than those described as long as the operation of said elements keeps the end of its nozzle free from ice. Moreover, inert gas other than nitrogen or air can be used to keep nozzles 38 clear when liquid nitrogen is not being injected; for example, dry helium or argon can be utilized. Thus the present embodiments are to be considered in all respects as illustrative and not restrictive, the scope of the invention being indicated by the appended claims rather than by the foregoing description and all changes that come within the meaning and range of equivalency of the claims are therefore intended to be embraced therein.

What is claimed is:

1. An elongated injection lance suitable for injecting a cryogenic liquid into a bath of substantially warmer liquid comprising:

an elongated tube extending at least several feet between an inlet portion and a discharge portion, said discharge portion terminating in a discharge orifice, b. inlet fluid coupling means on the inlet portion of said elongated tube, c. mounting means on the inlet portion of said elongated tube for mounting said injection lance in an operative position, d. an electrical resistance heater extending at least eight inches along and in thermal contact with the discharge portion of said elongated tube, e. a source of electrical current, and f. control means for supplying controlled amounts of electrical current to said heater sufficient for maintaining said discharge portion and discharge orifice free of frozen masses of the warmer liquid obstructing the flow of fluid through said lance.

2. The injection lance as claimed in claim 1 further including thermal insulation means surrounding said elongated tube and extending from adjacent said inlet portion to adjacent said discharge portion for preventing direct thermal contact of said warmer liquid with said elongated tube along the major length thereof.

3. The injection lance as claimed in claim 2 wherein said control means comprise timer means for intermittently supplying current to said electrical resistance heater in accordance with a predetermined time schedule.

4. The injection lance as claimed in claim 1 wherein a portion of said electrical resistance heater extends beyond said discharge orifice for preventing the formation of frozen obstructions immediately adjacent said discharge orifice.

5. a dispensing system for injecting a first liquid into a bath of substantially warmer liquid comprising:
   a. a source of first liquid,
   b. a source of gas,
   c. an elongated injection lance, said lance extending several feet from an inlet portion to a discharge portion,
   d. conduit means connecting said source of first liquid and said source of gas to said inlet portion of said injection lance,
   e. first valve means in said conduit means controlling the supply of first liquid to said injection lance, and
   f. second valve means in said conduit means controlling the flow of gas to said injection mance for preventing inflow of the warmer liquid into the discharge portion of said lance and forming frozen obstructions therein when said first liquid is not being supplied through said injection lance.

6. The injection lance as claimed in claim 5 wherein said source of liquid comprises a source of liquid nitrogen, and said source of gas comprises a source of nitrogen gas.

* * * * *